(12) United States Patent
Rossi

(10) Patent No.: US 6,879,759 B2
(45) Date of Patent: Apr. 12, 2005

(54) APPARATUS AND METHOD FOR ON-LINE BINDER LAYLENGTH MEASUREMENT AND ADJUSTMENT

(75) Inventor: Michael T. Rossi, Maiden, NC (US)

(73) Assignee: Alcatel, Paris (FR)

( * ) Notice: Subject to any disclaimer, the term of this patent is extended or adjusted under 35 U.S.C. 154(b) by 468 days.

(21) Appl. No.: 09/755,081

(22) Filed: Jan. 8, 2001

(65) Prior Publication Data

US 2002/0090181 A1 Jul. 11, 2002

(51) Int. Cl.[7] .................................................. G02B 6/44
(52) U.S. Cl. ........................ 385/100; 385/103; 385/113
(58) Field of Search .................................. 385/100–114

(56) References Cited

U.S. PATENT DOCUMENTS

| | | | |
|---|---|---|---|
| 4,131,757 A | | 12/1978 | Felkel |
| 4,497,537 A | * | 2/1985 | Dench ......................... 385/108 |
| 4,757,700 A | | 7/1988 | Dotti et al. |
| 5,030,841 A | | 7/1991 | Wampfler |
| 5,165,003 A | * | 11/1992 | Carter .......................... 385/112 |
| 5,345,525 A | * | 9/1994 | Holman et al. ............. 385/104 |
| 5,345,526 A | * | 9/1994 | Blew ........................... 385/112 |
| 5,703,983 A | * | 12/1997 | Beasley, Jr. ................. 385/104 |
| 5,729,966 A | * | 3/1998 | Grulick ........................ 57/293 |
| 5,809,194 A | * | 9/1998 | Lovie .......................... 385/104 |
| 5,982,967 A | | 11/1999 | Mathis et al. |
| 5,983,617 A | | 11/1999 | Nelson et al. |
| 6,088,499 A | | 7/2000 | Newton et al. |
| 6,293,081 B1 | * | 9/2001 | Grulick et al. ................ 57/293 |
| 6,314,713 B1 | * | 11/2001 | Fitz et al. ..................... 57/293 |

FOREIGN PATENT DOCUMENTS

| | | |
|---|---|---|
| FR | 93 14477 A1 | 11/1993 |
| WO | WO 91/12119 | 8/1991 |

* cited by examiner

*Primary Examiner*—Hemang Sanghavi
*Assistant Examiner*—Scott A Knauss
(74) *Attorney, Agent, or Firm*—Sughrue Mion, PLLC

(57) ABSTRACT

A method and apparatus for determining and adjusting binder laylength during the process of manufacturing a selected fiber optic cable design. Specifically, a binder, having a distinguishing and physically detectable feature, is wrapped around fiber optic bundles or a buffer tube. A detection system detects the unique feature associated with the binder and thus creates a calculates a representative distance value. The distance value is calculated in relation the periodic spacing between two detected points on the physically detectable binder and is continuously monitored by a closed feedback loop. A computer receives status data from the closed feedback loop and compares the received data to a stored laylength parameter. In light of the comparison, an algorithm adjusts the binder head speed accordingly. This process repeats until the desired stored laylength is detected by the detection system.

20 Claims, 4 Drawing Sheets

APPARATUS AND METHOD FOR ON-LINE BINDER LAYLENGTH MEASUREMENT AND ADJUSTMENT

BACKGROUND OF THE INVENTION

1. Technical Field of the Invention

This invention relates to the field of fiber optic cables and more particularly to a fiber optic cable having a detectable binder that enables a binder laylength to be measured during the cable manufacturing process.

2. Description of the Related Art

Multi-fiber cables are widely used for communication purposes including telecommunication and data transmission. In particular, fiber optic cables are commonly incorporated into communication networks thus enabling the communication network to operate with wide bandwidth and low noise operation.

As would be understood by one skilled in the art, fiber optic cables customarily include a strength member and an protective outer jacket. Buffer tubes, housing the optic fibers, are positioned around the strength member in a variety of configurations thereby providing an assortment of fiber counts depending on the chosen configuration. These individual fibers are usually grouped into a variety of fiber optic bundles. A binder is then wrapped around the fiber optic bundles or the buffer tube itself. The core, comprising the buffer tubes configured around the strength member, is then encased by a plastic outer jacket thereby forming a fiber optic cable.

Binders consist of a tape-like material and are used in a fiber optic cables to bind cable components together. As stated above, one or more binders may be stranded around a cable component, such as a buffer tube, thus providing additional strength in to the cable components. Furthermore, binders may be stranded around groups of optic fibers to form fiber optic bundles.

Binders also help couple buffer tubes to the strength member in addition to keeping the stranded loose buffer tubes from moving during fluctuations in temperature. The laylength of the binder itself is critical and differs with each fiber optic cable design. For example, if a particular cable design is sensitive, the binder laylength must be properly adjusted (tightened or loosened) to protect the buffer tube from movement resulting from temperature fluctuations.

Color is commonly used in the fiber optic cable industry to aid in the identification of individual optic fibers and buffer tubes. Industry standards define the colors used to identify particular buffer tubes or optic fiber. Color coding the buffer tube allows technicians to easily distinguish between different optical fibers.

Manufacturing fiber optic cables has increasingly developed into an automated process. Measuring the length of the binder material necessary for a particular cable design, however, is still a manual process. Traditionally, the binder is manually measured using a ruler or a tape measure. The binder laylength is then calculated by measuring the distance from a first peak on the bound core to a second peak on the bound core, or from one binder center to the next binder center. Manually measuring the binder laylength is therefore a trial and error process. Often, cable portions must be scrapped until an acceptable measurement is obtained for the particular cable design.

This manual process can result in frequent human error and a steep increase in operating cost due to system downtime and scrap. An incorrect binder laylength can also result in a cable that is susceptible to thermal failure due to optical unit movement. Accordingly, an automated process for measuring the length of a binder is essential.

SUMMARY OF THE INVENTION

In view of the foregoing background, an aspect of the present invention provides a method for detecting, calculating, measuring, and automatically adjusting a binder laylength using a fluorescing, colored or otherwise physically detectable binder, wherein the binder is detected by a detection system.

It is yet another aspect of the invention to provide a method for measuring, calculating, evaluating and adjusting the length of a binder while a stranding operation is in progress, thus avoiding the traditional problems encountered when the automated stranding machine is shut down to allow manual measurement of the binder laylength.

It is still another aspect of the invention to provide a binder having a distinctive and physically detectable feature. Examples of a detectable binder feature includes, but is not limited to: fluorescing elements, color, identifiable markings on the binder (fiducials), magnetic or metal strip within the binder, or anything that can be detected by a detection system. The binder further consists of a flexible material that enables the binder to be stranded around different elements of the fiber optic cable.

A preferred embodiment of the present invention includes a method for measuring, calculating and adjusting a binder laylength during the process of manufacturing a selected fiber optic cable design. Specifically, a configuration of buffer tubes are positioned around a central strength member. The buffer tubes house therein a variety of optic fiber assortments including individual optic fibers and optic fibers arranged in bundles. A binder, having a physically detectable feature, is wrapped around the fiber optic bundles or the buffer tube itself in order to provide support and protect against unnecessary movement of the buffer tubes. A detection system scans and detects the physically discernable binder feature. The binder laylength is thereby electronically adjusted through a closed feedback loop until the desired input laylength is detected by the detection system.

In another preferred embodiment of the present invention, a strander comprising a frame and a rotatable carriage, is utilized in the manufacturing of fiber optic cables wherein the fiber optic cable being manufactured includes a configuration of buffer tubes positioned around a central member. Each buffer tube houses a variety of individual optic fiber and optic fibers arranged in bundles. A wrapper strands the physically detectable binder around the fiber optic bundles. Alternatively, the physically detectable binder may also be stranded around the buffer tube itself.

A detection system then detects the unique feature associated with the detectable binder. A distance value is calculated in relation the periodic spacing between two detected points on the physically detectable binder. The distance value is fed into a closed feed back loop. A PLC receives status data from the closed feedback loop and compares the received data to a stored laylength parameter. The stored laylength value also includes a tolerance. If the received data does not match the stored parameter (or fall within the tolerance), an error signal is transmitted to an algorithm stored in a binder adjustment unit. This unit may be any unit that controls the adjustment of the binder laylength. Examples of these adjustment units include, but are not limited to: a binder head speed control unit that spins the binder head faster to lay more binder in a shorter period of time and a main line speed control unit that increases the main line speed and thus spreads out the lay between binders. The algorithm thereby adjusts the binder head speed and/or line speed accordingly. This process repeats until the desired input laylength is detected by the detection system.

In still another preferred embodiment of the present invention, a buffer tube houses an assortment of individual optic fibers and optic fibers arranged into bundles. An adjustable binder, having physically detectable features, is stranded around the buffer tube providing additional strength to the tube itself. An example of a detectable binder feature includes, but is not limited to: fluorescing elements, color, identifiable markings on the binder (fiducials), magnetic or metal strip within the binder, anything that can be detected by an in-line detector. Thus, the buffer tube of the preferred embodiment can be utilized in a system for measuring binder laylength.

DETAILED DESCRIPTION OF THE INVENTION

The present invention will now be fully described with reference to the accompanying drawings, wherein preferred embodiments of the invention are shown. This invention may be embodied in many different forms and should not be construed as limited to the embodiments set forth herein. Rather these embodiments are provided so that the disclosure will be thorough and complete.

Figure 1:
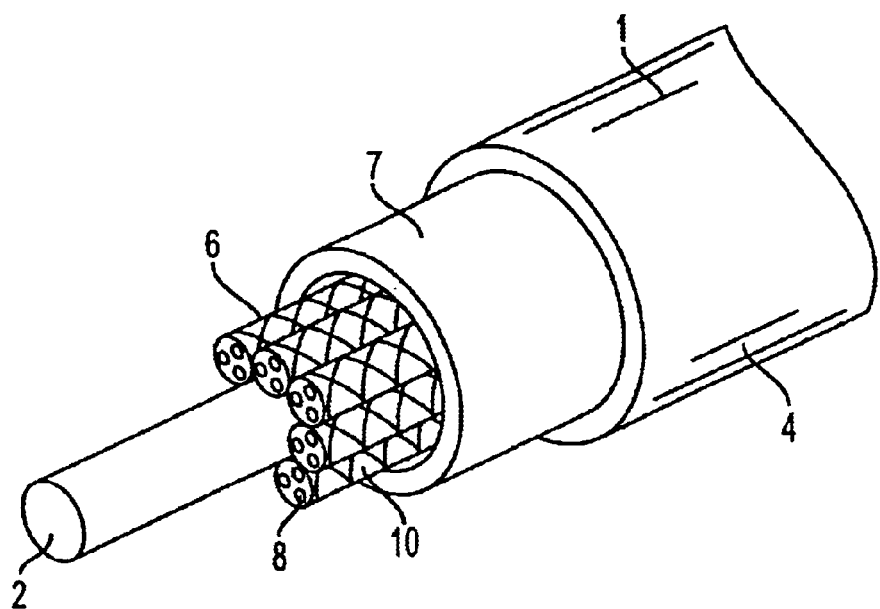
FIG. 1 is a perspective view of the end portion of a fiber optic cable according to the present invention.
Figure 2:
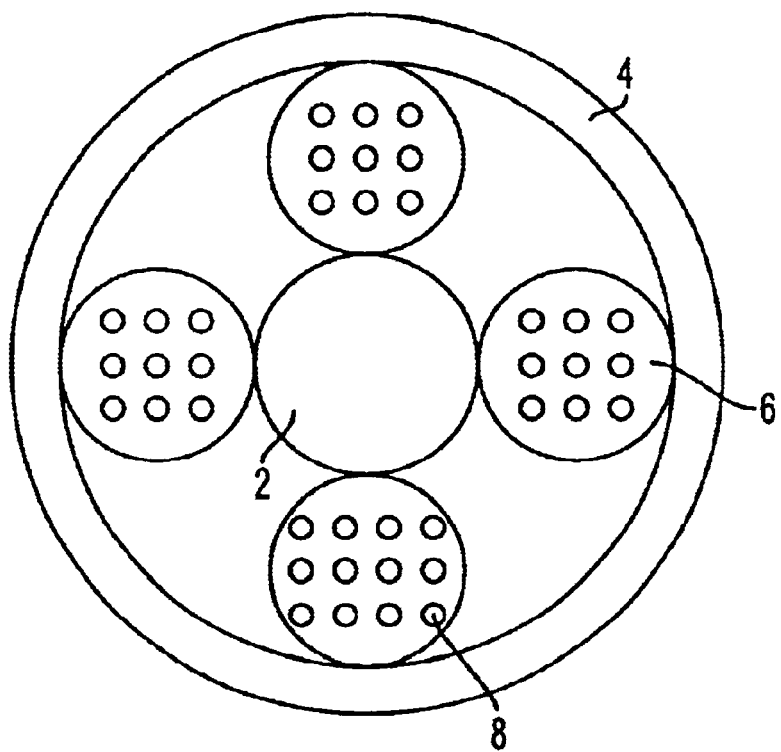
FIG. 2 is a cross sectional view of a fiber optic cable according to the present invention.

Referring now to FIGS. 1 and 2, a fiber optic cable 1 according to the present invention is displayed. Cable 1 includes a core member 2, a configuration of buffer tubes 6 positioned around the core member 2 and a protective outer jacket 7. In FIG. 1, core member 2 is an elongated lengthwise extending rod that functions as a strength member. Core member 2, however, may be formed in an assortment of shapes using a variety of materials such as; a fiber reinforced plastic rod or a metal wire with a plastic covering. It is commonly understood by those skilled in the art that the core member is utilized for a number of purposes, a primary purpose being to add strength, stability and protection to the fiber optic cable 1 itself.

A group of buffer tubes 6 are positioned around the core member. As would be commonly known in the art, buffer tube 6 can be arranged in different configurations thus allowing the designer to control the fiber count of the cable. A single layer of buffer tubes 6 is shown to encircle the core member in FIG. 1. This is just one example of a buffer tube configuration. Any and all configurations of buffer tubes, whether or not they are placed around a core member, shall be construed within the scope of this invention. Each buffer tube 6 includes a binder 10 that is stranded about the circumference of the buffer tube 6. The binder will be fully described below.

Located within each buffer tube 6 is an assortment of optic fibers arranged into groups of fiber optic bundles 8. As disclosed above, the optic fiber can also be arranged in a variety of configurations within the buffer tube that allows the cable designer to control the fiber count of a particular cable. A binder 10 may also be stranded around each fiber optic bundle 8 or buffer tube 6. Additionally, the binder 10 may be color coded to aid in the identification of the fiber optic bundles 8 and buffer tubes 6.

To complete the fiber optic cable, a protective outer jacket 4 is place around the components of the fiber optic cable, namely the buffer tubes 6 surrounding the core member 2. This protective outer jacket 4 helps protects the cable components from environmental damage.

Figure 3:
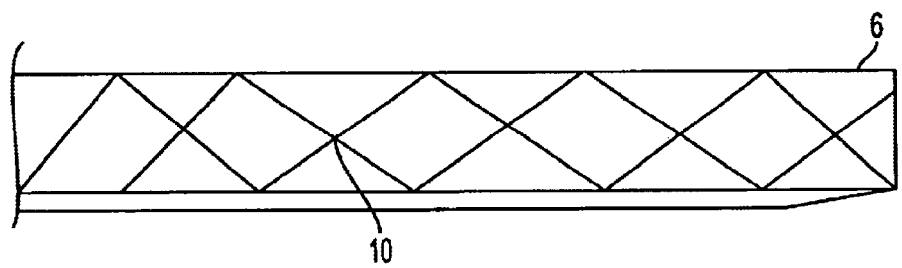
FIG. 3 is a three dimensional view of a binder stranded around an individual buffer tube.

Turning now to FIG. 3, FIG. 3 depicts an embodiment of the present invention wherein a physically detectable binder is stranded about the circumference of a buffer tube. Binder 10 is formed of a flexible material and arranged in pattern around the buffer tube 6. The binder also contains a physically detectable feature that can be detected by an on-line detector. An example of a detectable binder feature includes, but is not limited to: fluorescing elements, color, identifiable markings on the binder (fiducials), magnetic or metal strip within the binder, or anything that can be detected by a detection system.

FIG. 3. depicts one example of a binder having a physically detectable feature. The embodiment in FIG. 3 illustrates a binder 10 having a florescent textile yarn arranged in a spaced helical pattern stranded around buffer tube 6. Binder 10, however, can be stranded around buffer tube 6 or a group of buffer tubes using numerous configurations all within the scope of the present invention. The fluorescent color, depicted in FIG. 3, radiates a unique frequency that is thereby detected by an optical scanner. It should be noted that the binder may also be stranded around individual fiber optic bundles as shown in FIG. 1. Numerous binders may be used to surround the buffer tube or fiber bundles. Alternatively, binder 10 can be manufactured having identifiable markings (including, but not limited to, dots, dashes, lines), fluorescent markings or magnetic or metal pieces positioned throughout the binder. The binder may also be a single color, have fluorescing elements or a magnetic or metal strip running the length of the binder. Thus, any distinguishing mark, that can be detected using a detection system falls within the ambit of this invention.

Figure 4:
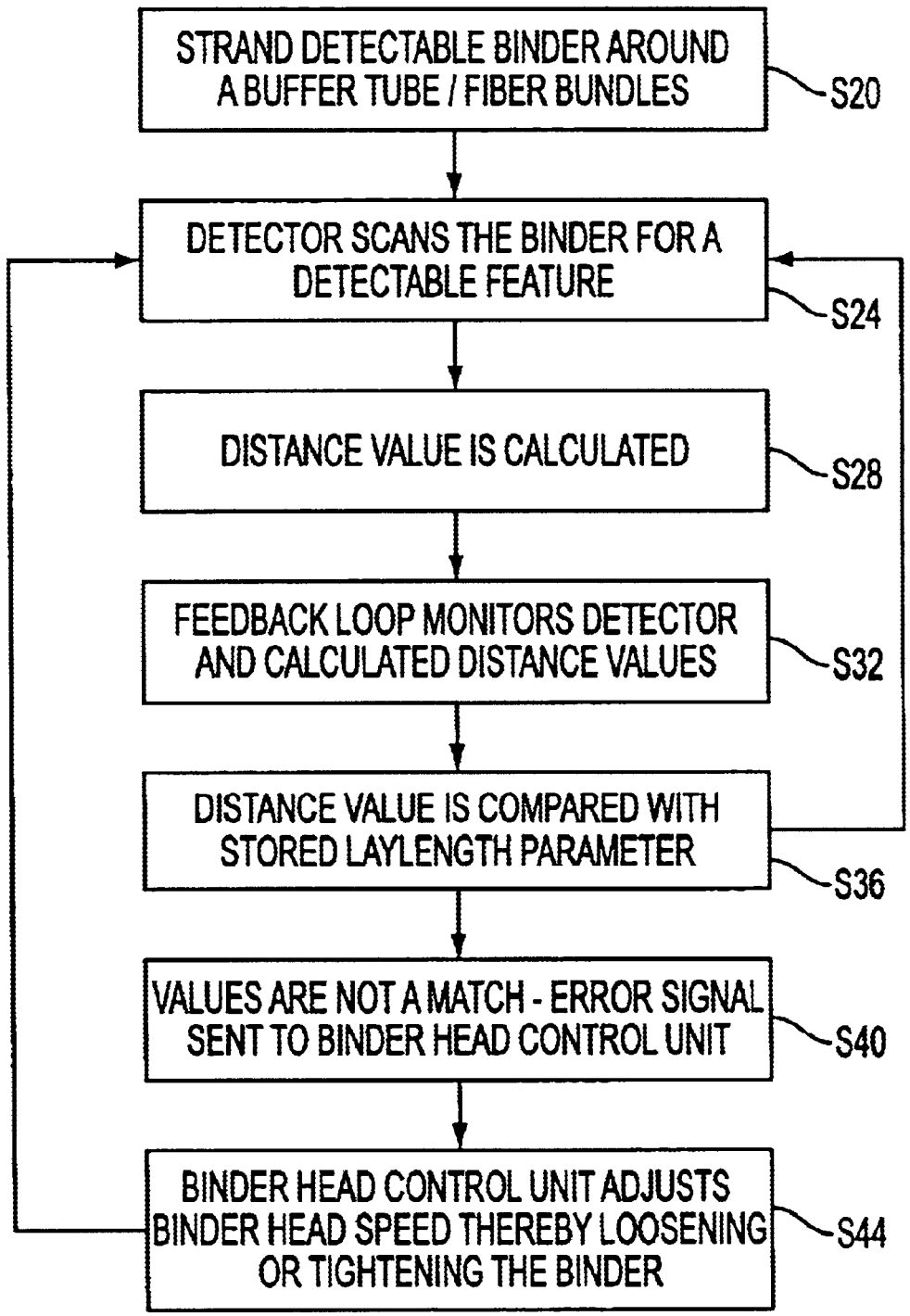
FIG. 4 is a flow chart describing the method used to measure and adjust a binder laylength.

In another preferred embodiment of the present invention, a binder laylength for a fiber optic cable being manufactured can be measured during the manufacturing process thus allowing binder laylength adjustments to be made immediately. FIG. 4 is a flow chart depicting the method for calculating and adjusting a binder's laylength.

As described above, manufacturing fiber optic cables is an automated process. When a design change is implement, (i.e.: begin production on a different cable design) it is necessary to change the design tolerances stored in the programmable logic controller ("PLC.") Binder laylength is typically measured before each production start for a new cable design. At times however, the binder may require additional adjustments subsequent to the set-up procedure. Binder laylength depends upon the cable design and thus can vary significantly. Binder laylength is also affected by the number of binders stranded around the cable component. The in-line detector, however, constantly scans the binder during the process thereby discerning and adjusting the binder to maintain the prescribed laylength within an allowable tolerance.

As depicted in FIG. 4, the method according to a preferred embodiment of the present invention includes the steps of stranding a physically detectable binder (S20) around a buffer tube 6 or a fiber optic bundle 8 during the production of the fiber optic cable.

The physically detectable feature in the binder (e.g., fluorescing, color, markings, magnetic or metal strip) is detected by the in-line detector (S24). If the binder has a detectable color, fluorescing color or color markings, an optical detector will be used for detection purposes. On the other hand, if the binder utilizes a magnetic or metal strip or is peppered with magnetic or metal markings, a metal detection system with be used for detection purposes.

Upon detection of the binder's distinguishing feature, the detection system calculates a distance value (S28) in relation the periodic spacing between two detected points on the detectable binder. For example, the detector is mounted at a 90 degree angle relative to the cable. Upon scanning the binder, the length between each detectable binder portion is calculated (the distance value). The detector is capable of reading the entire visible length of wrapped binder, and can be programmed to look for an average distance between the lengths of each wrap. If the binder has fiducial elements, the lengths between the detectable portions of the binder are calculated and averaged in order to compensate for marks that may be slightly offset from the circumferential position (such positions include, but are not limited to: peak-to-peak, center-to-center or bottom-to-bottom). The distance value is then compared to input tolerance to determine if the laylength is within the tolerance.

A closed feedback loop continuously monitors the calculated distance value (S32). The calculated distance value is then compared to a store laylength parameter (with tolerance) value (S36). When the calculated distance value does not match the stored parameter, an error signal is transmitted to the binder head control unit, or main line speed control (S40). An algorithm, that controls the binder head unit speed or main line speed, receives the error signal as input data. The algorithm appropriately adjusts the speed of the binder head unit, or main line speed control (S44), which in turn adjusts the binder length, according to the error signal received as input data. Increasing the binder head unit speed tightens or reduces the binder laylength around the cable component whereas decreasing the speed loosens or increases the binder laylength around the cable component. This process repeats until a distance value equivalent to the stored laylength value (plus a input tolerance) is detected by the detection system. In a preferred embodiment, the process described above is implemented using a programmable logic controller for machine control. There are, however, numerous ways to implement this process, each falling within the scope of this invention.

Another preferred embodiment of the present invention, provides a stranger machine, controlled by a PLC, having a frame and rotatable carriage upon which the fiber optic cable being produced is mounted. Additionally, the strander has a binder head control unit that wraps the detectable binder around a buffer tube prior to the buffer tube.

While the strander is wrapping the detectable binder around the cable component, a detection system frequently or continuously scans the binder for the detectable feature. Assuming the binder employs one of the numerous physically detectable features, the detection system calculates a distance value according to the periodic spacing between two detected points on the physically detectable binder which correspond to the actual laylength.

As disclosed above, a closed feedback loop continuously monitors the distance value calculated by the detection system. Furthermore, the calculated distance value is constantly updated and compared to a stored laylength parameter value (plus an input tolerance) to determine any possible errors. When the calculated distance value does not match the stored parameter, an error signal is transmitted to an adjustment unit. This unit may be any unit that controls the adjustment of the binder laylength. Examples of an adjustment unit includes, but is not limited to: a binder head speed control unit that spins the binder head faster to lay more binder in a shorter period of time and a main line speed control unit that increases the main line speed and thus spreads out the lay between binders.

An algorithm, that controls the binder head unit speed or main line speed, receives the error signal as input data. The algorithm appropriately adjust the speed of the adjustment unit according to the error signal received as input data. For example, increasing the binder head unit speed tightens the binder laylength around the cable component whereas decreasing the speed loosens the binder laylength around the cable component. The present invention, therefore, further automates the process of manufacturing fiber optic cables.

Many modifications and other embodiments of the invention will come to the mind of one skilled in the art having the benefit of the teachings presented in the foregoing description and the associated drawings. Therefore, it is to be understood that the invention is not to be limited to the specific embodiments disclosed, and that all modifications and embodiments are intended to be included within the scope of the appended claims.

What is claimed is:

1. A fiber optic cable binder comprising:
   a flexible material; and
   a physically detectable feature within the flexible material,
   wherein said physically detectable feature is detectable by an automated detection system during installation of said binder.

2. The fiber optic cable binder of claim 1, wherein said detectable feature is repeated at a regular interval along a length of said binder.

3. The fiber optic cable binder of claim 1, wherein the physically detectable feature is a fluorescing element.

4. The fiber optic cable binder of claim 1, wherein the physically detectable feature is a color.

5. The fiber optic cable binder of claim 1, wherein the physically detectable feature is a magnetic or metal strip.

6. The fiber optic cable binder of claim 1, wherein the physically detectable feature is an identifiable marking.

7. A fiber optic cable comprising the binder set forth in claim 1.

8. A fiber optic cable, comprising:
   an outer jacket;
   at least one optical fiber within said outer jacket; and
   a binder positioned between said at least one optical fiber and said outer jacket, wherein said binder comprises:
      a flexible material; and
      a plurality of physically detectable features which are positioned within said flexible material,
   wherein said plurality of physically detectable features are detectable by an automated detection system during manufacture of said cable.

9. The fiber optic cable of claim 8, wherein said detectable feature is repeated at a regular interval along a length of said binder.

10. The fiber optic cable of claim 8, wherein the physically detectable feature is a fluorescing element.

11. The fiber optic cable of claim 8, wherein the physically detectable feature is a color.

12. The fiber optic cable of claim 8, wherein the physically detectable feature is a magnetic or metal strip.

13. The fiber optic cable of claim 8, wherein the physically detectable feature is an identifiable marking.

14. A fiber optic cable binder, comprising:

a flexible material; and a plurality of physically detectable features which are positioned within said flexible material, wherein said plurality of physically detectable features are by an automated detection system during manufacture of said cable.

15. The fiber optic cable binder of claim 14, wherein said plurality of detectable features are repeated at a regular interval along a length of said binder.

16. The fiber optic cable binder of claim 14, wherein the physically detectable features are a fluorescing element.

17. The fiber optic cable binder of claim 14, wherein the physically detectable features are a color.

18. The fiber optic cable binder of claim 14, wherein the physically detectable features are a magnetic or metal strip.

19. The fiber optic cable binder of claim 14, wherein the physically detectable features are an identifiable marking.

20. A fiber optic cable comprising the binder of claim 14.

* * * * *